March 5, 1968

R. NOUEL 3,371,384

INJECTION VALVE PRESSURE REGULATOR

Filed May 6, 1965

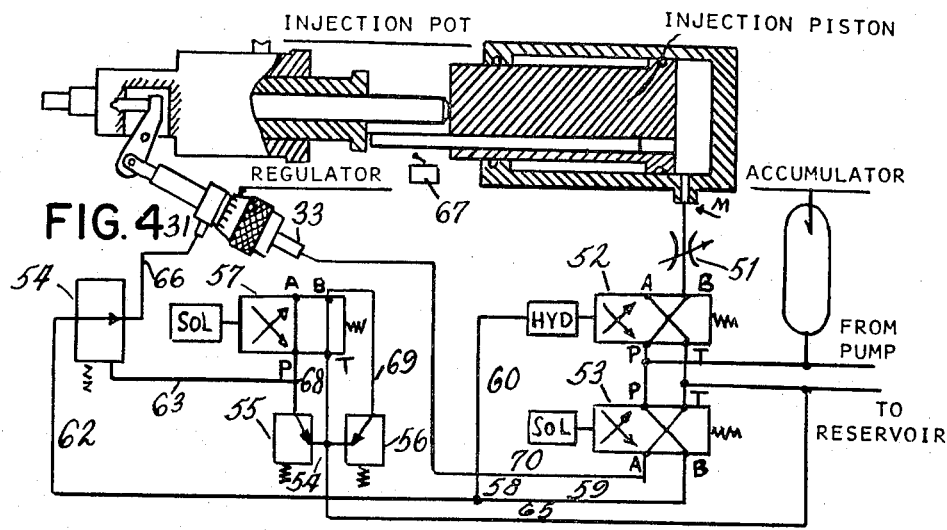
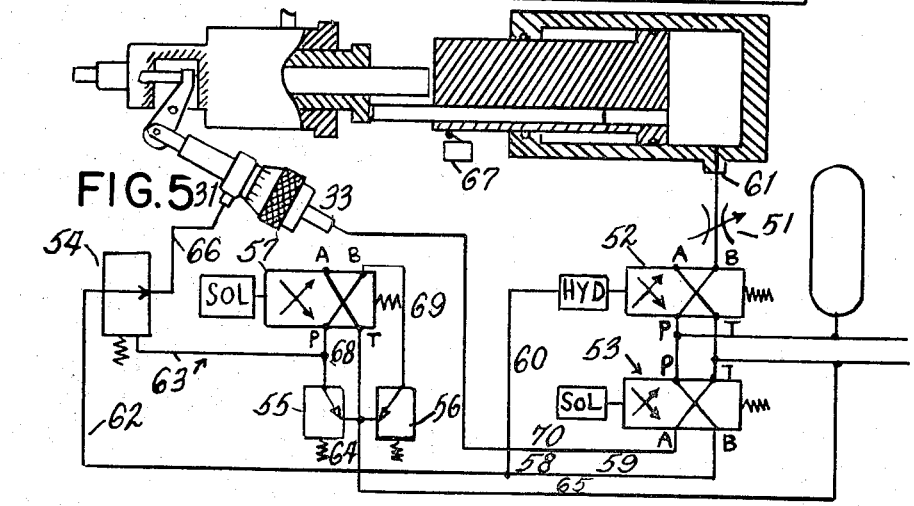
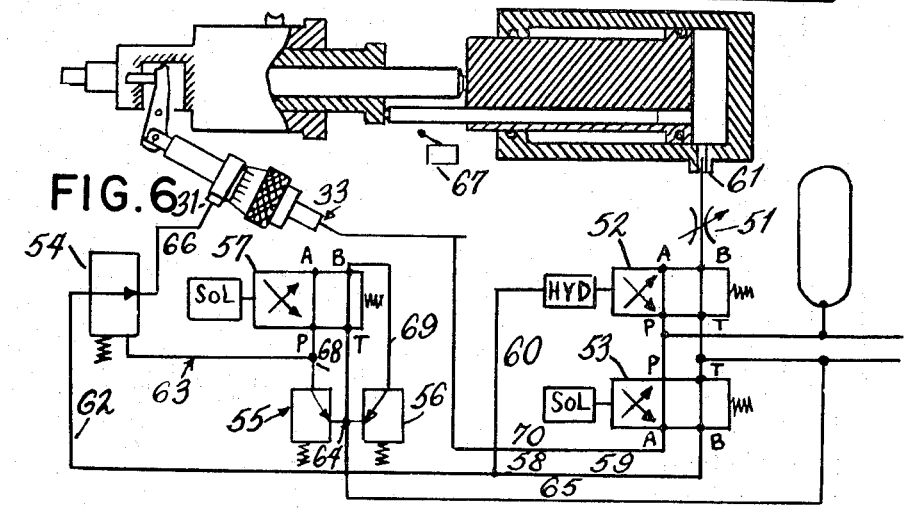

United States Patent Office 3,371,384
Patented Mar. 5, 1968

3,371,384
INJECTION VALVE PRESSURE REGULATOR
Robert Nouel, Villejuif, France, assignor to Lenslite Co., Inc., a corporation of Florida
Filed May 6, 1965, Ser. No. 453,798
14 Claims. (Cl. 18—30)

This invention relates in general to apparatus for the injection molding of plastics and more particularly to an improved injection valve regulator valve for use between an injection pot and the mold.

In my co-pending application Ser. No. 171,878 filed Feb. 8, 1962, now Patent No. 3,241,191, is described an automatic pressure regulator for injection presses, constituted by a rod forming a slide valve traversing the injection nose and its injection channel, and having three parts with different sectional diameters, a central part with the smallest diameter to permit passage of the material to be injected into the mold, and two regulator parts whose difference in diameters open a valve passage and subsequently causes axial displacement of the slide valve, at the time the mold is filled, to close the nozzle outlet and stop feed of plastic, the pressure on the slide valve, due to injection of the plastic, being opposed by a pivoted lever activated by a resilient means which can be regulated to balance the said pressure.

In my co-pending application Ser. No. 289,173, filed June 18, 1963, now Patent No. 3,241,192, is disclosed a similar apparatus in which the injection nose comprises two superposed vertical chambers, whereof the upper chamber communicates with the injection pot and the bottom chamber with the space within the mold, the two chambers communicating with one another by an axial orifice traversed by the slide valve rod, the said orifice having the same diameter as the larger diameter part of the valve so that the slide valve rod may close the said orifice when the mold is filled with injected material and the slide valve rod undergoes a thrust due to the rise in pressure in the mold and the above-mentioned lower chamber sufficient to exceed the opposing pressure exerted on the slide valve rod by a spring and lever device. According to one described arrangement, the spring and lever device is constituted by a bent lever pivoting around a fixed axis mounted in the injection nose and having one arm hooked in a groove surrounding the outer end of the slide valve rod, and the other arm subjected to elastic pressure of a spring. A locking means is provided to hold the slide valve rod in its closed position to prevent any flow of the material out of the injection nose, and a damper device, of the dash-pot type, may be applied to the elastic means acting on the lever to decelerate the speed of action of the regulator.

It has been found that, in spite of the excellent general functioning of the devices briefly described above, sometimes the automatic pressure regulator extrudes in an undesired fashion by decelerating the speed of injection and failing to entirely fill the mold. This occurs because the plastic material injected, has to pass through some very tiny passages, causing a momentary overpressure in the terminal chamber. The momentary overpressure can cause the premature closure of the communication between the terminal chamber and the chamber connected to the injection pot to stop injection completely, or considerably decelerate the speed of injection by partially closing the communicating passage between chamber.

The present invention relates to improvements and modifications in my regulators, as described above, which eliminate the aforesaid difficulties: the invention proposes to uniformly regulate the section of passage offered to the plastic material as it enters the terminal chamber, which communicates directly with the mold, and to automatically close this passage only at the precisely right moment, i.e. when the filling of the mold is complete.

It is therefore a primary object of the present invention to provide an improved pressure regulator which ensures that the speed of injection is maintained and that the feed of injected material is not prematurely cut off before the mold is completely filled.

It is a further object of the invention to provide an improved pressure regulator, of the above described characteristics, whose action is more certain and positive and which provides better regulation than heretofore achieved.

It is another object of the invention to provide an improved pressure regulator, having the above described characteristics, which is of simple construction and easy and economical to fabricate, assemble and use.

I achieve the aforesaid objects and advantages by constructing the improved pressure regulator so that the slide valve rod forms a tappet valve acting on one end of a piovted lever whose other end is articulated to a sliding rod which displaces a cut-off piston. The cut-off piston slides in a regulator piston which can oscillate in a hollow support fixed to the injection pot, means being provided to exert a fluid pressure on the regulator piston as a function of the piston of a plastic feed and injection piston at the completion of filling of the mold.

The novel features that are considered characteristic of the invention are set forth with particularity in the appended claims. The invention itself, however, both as to its organization and its method of operation, together with additional objects and advantages thereof, will best be understood for the following description of a specific embodiment when read in connection with the accompanying drawings, wherein like reference characters indicate like parts throughout the several figures and in which:

FIGS. 4, 5 and 6 are schematic diagrams of a fluid pressure circuit in three different stages of operation.

Figure 1:
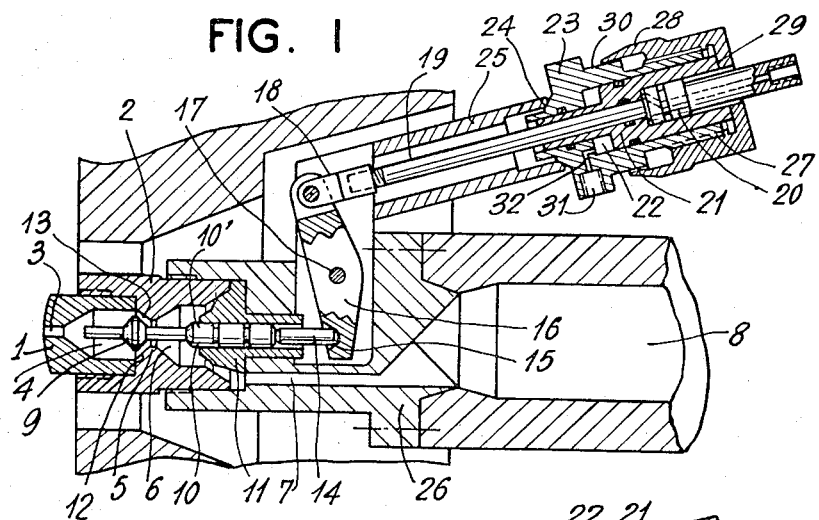
FIG. 1 is a sectional view of a pressure regulator according to the invention, with its slider tappet valve locked in position to provide a predetermined and adjustable section of passage for feed of plastic to a mold.
Figure 2:
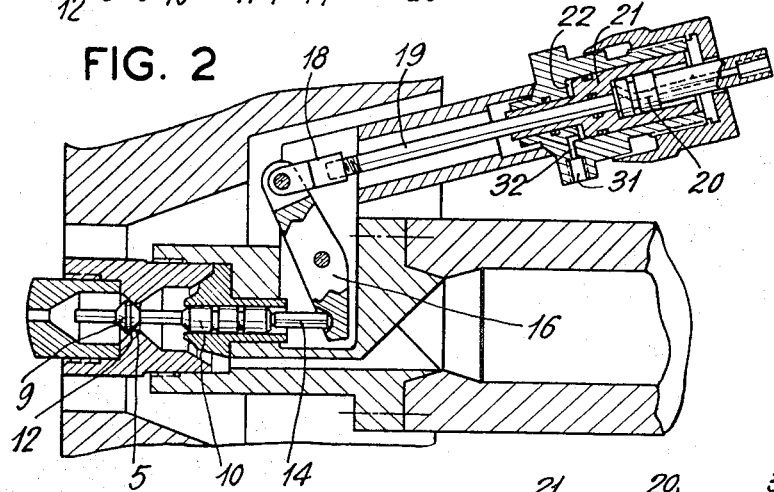
FIG. 2 is a sectional view similar to FIG. 1 showing the regulator parts as positioned at the end of the injection, after the automatic pressure regulator has functioned to cut off feed of the plastic.
Figure 3:
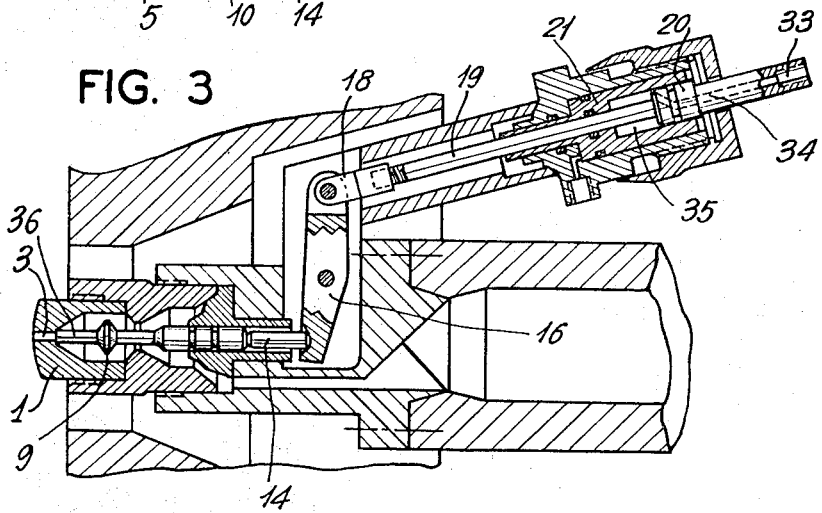
FIG. 3 is a similar sectional view after completion of the injection period and removal of the mold, showing closure of the channel connecting the terminal chamber with the mold.

Referring now more particularly to the drawings, FIGS. 1-3 show a preferred embodiment of the improved regulator as comprising a nozzle 1 which encloses a terminal chamber 4 and is fixed on the piece 2, which encloses a second and communicating chamber 6. In the nozzle is drilled a channel 3 connecting the terminal chamber 4 with the mold (not shown). A circular orifice 5, in tubular piece 2, connects the chamber 6 (itself connected by channel 7 to the injection pot 8) to the terminal chamber 4.

The slider tappet valve 9 has a tail 10 slideable in a bore 10′ in piece 11 and concentric to the annular orifice 5, so that valve 9 is movable to occupy various positions. At its end opposite to channel 3, the tail 10 may contact one end of a rod 14 which can be engaged by the end 15 of control lever 16, pivoted at 17. The other end of lever 16 is articulated to the cap 18 on the rod 19 fixed to a closure or cut-off piston 20, whose dimeter is larger than that of rod 19. Piston 20 is mounted to slide in a bore in the regulator piston 21, which in turn slides in a blind bore 22 in the c ylinder, or tubular body, 23. The cylinder 23 has a rounded, or spherical, bearing surface 24 which permits it to oscillate in a corresponding rounded, or spherical, bearing surface formed at the outer end of a hollow support 25. This support is integrally secured to a piece 26 fixed on the injection pot 8 and securing and connecting the latter to piece 2 which in turn supports nozzle 1. Cylinder 23 is provided with an external thread 27 on which is screwed the ring 28 having an outer closure flange that serves as a stop 29 for outward movement of regulating piston 21. A scale 30 forming a vernier is engraved on the outer surface of cylinder 23 so that threaded adjustments of ring 28 may be made and thus the displacements of the piston 21 can be precisely regulated and adjusted as desired, the piston movement outwardly being stopped by abutment against flange 29 on ring 28. A tube, not shown, is threaded to bring pressure fluid into the coupling 31 on cylinder 23. The pressure fluid then passes through channel 32, into bore 22.

The cut-off piston 20, at its outer end, is provided with a threaded coupling 33, FIG. 3, and a passage 34 communicating with the inner end of the bore in which piston 20 rides. A flexible fluid pressure hose (not shown) is threaded to coupling 33. The outward movement of piston 20 is limited by engagement of the outer end of the piston with the abutment flange 29.

The injection pot 8 is provided with an injection mechanism (not shown) which may take the form as shown in FIGS. 3, 4 and having a pressure fluid circuit as shown in FIG. 12 of my aforesaid application Serial. No. 289,173, now Patent No. 3,241,192. In this mechanism one or more electric contacts such as 159, 162 and 164 are disposed in the path of the injection piston itself or of an abutment part carried by the piston. Such contact is suitably positioned in relation to the dimensions and shape of the mold as well as to the plastic material being used to energize an electro-valve such as 48, FIG. 12, in the aforesaid application, to modify the nominal hydraulic pressure at coupling 31 of the present invention when the mold is filled, and to replace said nominal pressure by a lower pressure, for example with the aid of an adjustable pressure reducer, this pressure modification itself being fixed as a function of the mold and the material. Since a full disclosure of such operation to reduce pressure to atmospheric, for example, on a given element valve regulator 110 is fully set forth with respect to the abutment dog 160 and electric switch contacts 162 in the injection pot on page 14 of aforesaid application, no further explanation herein is deemed necessary.

The improved injection valve regulator above described operates in the following manner.

In the position shown in FIG. 1, the tappet valve proper 9, is spaced a certain distance from the conical wall 12 leading from orifice 5 and delineates with the valve 9 a through passage 13 so that plastic material can pass to chamber 4 of the nozzle. Because of the pressure exercised by the injected material in the chambers 6 and 4, during the course of the injection, the plastic material constantly tends to move slider tappet valve 9 toward the right, a direction which would cause closure of the orifice 5 except that this movement is balanced by an opposing movement, as will now be explained. The tail 10 of the slider valve acts on rod 14 which moves the end 15 of lever 16 and causes the latter to turn counterclockwise about its pivot 17. This displaces the rod 19 to the left, drawing the cut-off piston 20 and the regulating piston 21, which slides in the blind cylindrical bore 22 of cylinder 23, in the same direction. The cylinder 23, due to its spherical bearing surface 24, oscillates in the corresponding spherical bearing surface of the support 25 to follow the movements of the lever 16. The ring 28 has been, or is adjusted by screwing in either direction to mark the desired graduation of vernier 30, i.e. to fix a desired suitable displacement of piston 21 which will retain passage 13 open and of a predetermined cross-section. The pressure of hydraulic, or other, fluid entering cylinder bore 22 through coupling 31 acts to move the regulating piston 21 to the right in FIG. 1 and entrains the cut-off piston 20. By means of rod 19 and cap 18, the lever 16 rocks clockwise and tends to move rod 14 and the valve 9 to the left so as to increase the section of passage 13. Since the plastic material being injected acts in the opposite direction on valve 9, if the useful section of regulating piston 21 has been suitably adjusted with regard to the value of the pressure of the hydraulic fluid admitted at 31, 32, 22, so that the force exerted by piston 21 is always greater than the force exerted by the plastic material on the valve 9, the position of the valve 9 will be directly related to the position of ring 28. By varying the adjustment of ring 28, one can thus vary in a positive fashion the size of the section of passage offered at 13 to the plastic material, which permits varying the speed of injection according to the mold to be used. This also enables one to benefit from the heat produced within the plastic material by the rolling (lamination) created at passage 13.

When the filling of the mold with injection material is about complete, the device brings in automatic pressure regulation to prevent the defects of previous devices mentioned above. The above briefly described injection piston, which is more fully described in the referenced co-pending application, and a rod solid with this piston in the injection pot 8, then strike an electrical contact and triggers the action of an electrovalve as has been described to reduce the pressure of fluid entering through coupling 31, the adjustment of the position of the contact and of the associated fluid pressure reducer are such, as a function of the mold and of the plastic material treated, that when the mold is filled, the valve 9 acts as a regulator end, as shown in FIG. 2, closes the orifice 5 because the back pressure from the filled mold, exerted through the plastic material moves valve 9 toward the right, as such back pressure now exceeds the reduced pressure in chamber 22 exerted by the pressure fluid on the regulator piston 21.

During the portion of the injection cycle when the mold is removed from the injection unit and nozzle 1, it is desirable to close the inner end of channel 3 of the nozzle to prevent residual pressures from pushing plastic material out of the nozzle chamber 4. To accomplish this, hydraulic, or other pressure, fluid is admitted through coupling 33 on cut-off piston 20. This pressure fluid moves through channel 34 to chamber 35 and causes the piston 20 to slide to the right while pushing the regulator piston 21 to the left and to the bottom of its accommodation in chamber 22, as shown in FIG. 3, and as permitted by the above described reduction of pressure at coupling 31 and connected chamber 22. The movement of cut-off piston 20 to the right is imparted to its rod 19 and cap 18 to turn the lever 16 clockwise, which causes its lower end 15 to move rod 14 and the valve 9 to the left closing passage 3. The forward projection 36 of valve 9 closes channel 3 in a positive fashion, a long as pressure is maintained at 33.

The hydraulic pressure at 33 is shut off when the mold is again returned to engage nozzle 1. The plastic material is again pushed toward the mold by the injection piston in pot 8, the pressure created in chamber 4, by the plastic introduced, acts on the valve 9 to remove part 36 from channel 3 and return the valve to the position shown in FIG. 1.

A preferred embodiment of a pressure fluid circuit suitable for operating the above devices is diagrammatically shown in FIGS. 4–6 in three different stages of operation. In the illustrated circuit, part 51 is a regulator unit for controlling flow of pressure fluid to the inlet of the injection cylinder; distributor 52 is preferably hydraulically controlled; electrovalve 53 controls the injection regulator; pressure reducing system 54 is controlled by first and second reduction valves 55 and 56 respectively and the electro-valve 57 for the second reduction stage, the latter being operated by electric contact 67.

FIG. 4 shows the pressure fluid circuit parts arranged as at the start of injection. Electro-valve 53 having been energized, the hydraulic or other pressure fluid passes from P through B establishes pressure at 58 in conduit 59. From 58, through conduit 60, the pressure fluid feeds (supplies) injection distributor 52 having hydraulic control. The latter establishes its own circuit P–B and feeds fluid through the regulation system of control unit 51 to the injection cylinder inlet 61. Unit 51 is regulated so as to get the desired injection speed. The pressure at 58 by means of conduit 62, also feeds fluid under pressure to the reducer 54. The latter comprises a balanced pull (equalized, compensated) device adapted to be under the control and regulation of the hydraulic pressure existing in passageway 62 and at the same time to be under the control and regulation of the hydraulic pressure of passageway 63, leading to pilot valve 55. Valve 55 comprises an adjustable check valve which creates loss of oil (overflow) escaping at 64 and through duct 65 leading toward the low pressure reservoir. The regulated pressure established in conduit 63 is transmitted through the pressure reducer 54 and the conduit 66 to the automatic pressure regulator, described above, where it arrives at coupling 31 (FIG. 1). The automatic pressure regulator subjected to this pressure regulation operates as described previously.

The pressure fluid circuit at the end of injection is shown in FIG. 5. Towards the end of the injection the feeding piston operates contact 67. This contact, connected with electro-valve 57, energizes the latter and connects the pilot valve 56 of the second stage of reduction through point 68, passage P–B, conduit 69 and conduit 63. Valve 56 comprises a check valve having an adjustable pressure lower than that of valve 55. The pressure which operates in passageway 66 drops to a lower value than at the start of the injection. The check valve 9 (FIG. 2) closes circular opening 5 and stops the plastic material from entering the mold when the mold is full.

FIG. 3 illustrates the condition of the pressure fluid circuit when the injection piston is to be returned to its start position.

Electro-valve 53 is de-energized by suitable means not shown. The latter follows the internal changeovers to connect P.A. and T.B. Conduit 59 being thus connected to the reservoir, injection distributor 52 is no longer fed (supplied). The pressure fluid no longer arrives at inlet 61 and the injection piston can withdraw under the thrust or pressure of the plastic material which penetrates the injection chamber in front of the feeding piston. Pressure fluid is fed to the inlet 33 of the automatic pressure regulator through P.A. of the electro-valve 53 and conduit 70 which closes part 36 of valve 9 of the pressure regulator against passageway 3 to prevent loss of plastic from the nozzle between injections.

Alternatively, other means than the contact described within the injection pot may be utilized as is well within the skill of one versed in fluid pressure circuits. For example, the reduction of pressure at 31 and application of pressure at 33 may be actuated by switching contacts made when either the mold, or the nozzle, is moved away from one another, or in response to an increase of pressure within the nozzle due to back pressure from the filled mold.

Although a certain specific embodiment of the invention has been shown and described, it is obvious that many modifications thereof are possible. The invention, therefore, is not to be restricted except insofar as is necessitated by the prior art and by the spirit of the appended claims.

What I claim is:

1. An injection valve pressure regulator comprising a nozzle having a chamber and adapted to introduce plastic material into a mold cavity, a pair of passages leading into and out of said chamber, valve means in said chamber including opposed seats at said passages and a valve member movable to engage said seats and close said passages, said valve member having sections of different diameter subject to pressure of plastic material being injected and responsive to the back pressure resulting from a filled condition of a mold cavity to urge the valve member against one of said seats to interrupt the flow of plastic material to said chamber, a fluid pressure device connected to said valve member, said fluid pressure device comprising a pair of pistons each slidable in a cylinder, means for applying pressure fluid to one cylinder to provide a force for urging said valve member to a position intermediate said valve seats, and means for applying pressure fluid to the second cylinder to move said valve member against said other valve seat to close the nozzle connection with the mold.

2. A pressure regulator according to claim 1 wherein said second cylinder comprises a bore in said first piston, said second piston sliding in said bore.

3. A pressure regulator according to claim 2 wherein said means for applying pressure fluid to the second piston comprises a rod protruding from both said first and second cylinders, a coupling orifice in the protruding end of said rod, and a passage through said rod and second piston connecting the coupling orifice to said bore of the first piston.

4. A pressure regulator according to claim 3 wherein said pressure fluid device connected to said valve member comprises a rod fixed at one end to said second piston and at the other end to one end of a pivoted lever, the other end of said pivoted lever being engageable with a slide rod for moving said valve member toward said other orifice seat.

5. A pressure regulator according to claim 4 wherein said first cylinder is supported by a support member having a rounded bearing surface, said first cylinder having a complementary rounded bearing surface engaging the bearing surface of the support member whereby said first cylinder may oscillate to follow movements of said lever.

6. A pressure regulator according to claim 4 wherein said first cylinder is adjustable in size whereby to regulate the movement of said valve member from said one seat and thereby control the size of an entry orifice between said one seat and the valve member.

7. An injection valve pressure regulator comprising a nozzle having a chamber and adapted to introduce plastic material into a mold cavity, entry and exit orifices leading into and out of said chamber, a valve member movable to close either of said orifices and to occupy an intermediate position in which both orifices are open, a fluid pressure device connected to said valve member by mechanical linkage, said device including means for applying a first pressure fluid to maintain said valve member in said intermediate position, and means for applying a second pressure fluid to move said valve to close said exit orifice.

8. An injection valve pressure regulator according to claim 7 wherein said fluid pressure device includes means for reducing the pressure of said first pressure fluid while applying the second pressure fluid.

9. A pressure regulator according to claim 7 wherein said valve member is so shaped as to be urged by pressure of plastic material in said chamber to move toward said entry orifice.

10. A pressure regulator according to claim 9 wherein said fluid pressure device includes means for admitting said first pressure fluid at reduced pressure when activated by movement of an injecting piston near the end of its stroke and the mold is nearly completely filled.

11. In a plastic injection press, an injection nozzle structure for connecting an injection mold to a plastic supply pot, said nozzle structure comprising means defining a chamber having a restricted exit orifice at one end and a restricted entrance orifice aligned therewith at the other end, a control valve mounted for reciprocation in said chamber and movable between extreme positions in which it closes said respective orifices, and calibrated positive pressure control means connected to said control valve for controlling its position independent of flow friction through said nozzle.

12. Apparatus in accordance with claim 11, in which said control valve includes a valve stem passing through said entrance orifice, means defining a second chamber surrounding the portion of said stem protruding through said entrance orifice, and a duct connecting said second chamber with said plastic supply pot.

13. Apparatus in accordance with claim 12, in which said duct communicates with said second chamber at a position lateral of the axis of said control valve, and in which said control valve has an operating tail portion slidable in an end wall of said second chamber opposite said first chamber.

14. Apparatus in accordance with claim 11, in which the margin of said entrance orifice and the facing surface of said valve are correspondingly beveled to define, when the valve is open, a diverging annular passageway.

References Cited

UNITED STATES PATENTS

| | | | |
|---|---|---|---|
| 2,940,123 | 6/1960 | Beck et al. | 18—30 |
| 3,241,192 | 3/1966 | Nouel | 18—30 |

FOREIGN PATENTS

| | | |
|---|---|---|
| 1,150,109 | 8/1957 | France. |
| 1,104,684 | 4/1961 | Germany. |

WILBUR L. McBAY, *Primary Examiner.*

ROBERT F. WHITE, *Examiner.*

R. B. MOFFITT, *Assistant Examiner.*